United States Patent
Jahns et al.

(12)
(10) Patent No.: US 6,200,681 B1
(45) Date of Patent: Mar. 13, 2001

(54) APPLICATION OF MICROCAPSULES AS LATENT HEAT ACCUMULATORS

(75) Inventors: Ekkehard Jahns, Weinheim; Bernd Reck, Grünstadt, both of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/554,076

(22) PCT Filed: Oct. 16, 1998

(86) PCT No.: PCT/EP98/06575

§ 371 Date: May 11, 2000

§ 102(e) Date: May 11, 2000

(87) PCT Pub. No.: WO99/24525

PCT Pub. Date: May 20, 1999

(30) Foreign Application Priority Data

Nov. 11, 1997 (DE) .............................................. 197 49 731

(51) Int. Cl.$^7$ ............................... B32B 15/02; C08F 2/32
(52) U.S. Cl. .................... 428/402.24; 524/801; 524/802; 428/402.21; 428/402.22
(58) Field of Search ..................... 428/402.21, 402.22, 428/40.24; 524/801, 802

(56) References Cited

U.S. PATENT DOCUMENTS 3,615,972 * 10/1971 Morehouse, Jr. et al. .
4,747,240 * 5/1988 Voisinet et al. ..................... 52/173 R
4,797,160 * 1/1989 Salyer ..................................... 106/96
5,456,852 * 10/1995 Isicuro .................................... 252/70

FOREIGN PATENT DOCUMENTS

0457154 * 5/1991 (EP) .

* cited by examiner

*Primary Examiner*—Samuel A. Acquah
(74) *Attorney, Agent, or Firm*—Oblon, Spivak, McClelland, Maier & Neustadt, P.C.

(57) ABSTRACT

Used as latent heat storage media of microcapsules I comprising as core materials one or more lipophilic substances whose solid/liquid phase transition is within the range from −20 to 120° C. and as shell a polymer obtainable by free-radical polymerization of a monomer mixture comprising from 30 to 100% by weight, based on the overall weight of the monomers, of one or more $C_1$–$C_{24}$-alkyl esters of acrylic and/or methacrylic acid (monomer I), from 0 to 80% by weight, based on the overall weight of the monomers, of a bi- or polyfunctional monomer (monomers II) which is insoluble or of low solubility in water, and from 0 to 40% by weight, based on the overall weight of the monomers, of other monomers (monomers III), and also novel microcapsules Ia, spray-dried microcapsules Ia', processes for their preparation and shaped articles and coating compositions comprising these microcapsules.

13 Claims, No Drawings

APPLICATION OF MICROCAPSULES AS LATENT HEAT ACCUMULATORS

The present invention relates to the use as latent heat storage media of microcapsules I comprising as core materials one or more lipophilic substances whose solid/liquid phase transition is within the range from −20 to 120° C. and as shell a polymer obtainable by free-radical polymerization of a monomer mixture comprising from 30 to 100% by weight, based on the overall weight of the monomers, of one or more $C_1$–$C_{24}$-alkyl esters of acrylic and/or methacrylic acid (monomer I), from 0 to 80% by weight, based on the overall weight of the monomers, of a bi- or polyfunctional monomer (monomer II) which is insoluble or of low solubility in water, and from 0 to 40% by weight, based on the overall weight of the monomers, of other monomers (monomers III).

The invention additionally relates to novel microcapsules Ia, to spray-dried microcapsules Ia' and to processes for producing them. Further subjects of the invention are shaped articles and coating compositions comprising these microcapsules.

An important research goal for reducing energy consumption and utilizing existing heat energy is constituted by latent heat storage media. These find multifarious application; for example, as heat transfer media in heating and cooling systems or as heat storage media in insulating materials or building materials. The way in which they operate is based on the enthalpy of transformation accompanying transition from the solid to the liquid phase or vice versa, which results in energy being absorbed from or released to their surroundings. They can therefore be used firstly for maintaining a constant temperature within a defined range and secondly, in a suitable arrangement, for improving heat insulation. Since one form of the storage medium is liquid, microcapsules, inter alia, have been used for ease of handling.

Microcapsules with a shell formed from polymers and copolymers of methyl methacrylate are known from EP-A-457 154 for reactive copy paper. It is therefore very important that these capsules have a flawless shell of uniform thickness so as to allow well-defined text.

In addition, US-A-3 615 972 describes a process for producing foamable microcapsules from methyl methacrylate with neopentane as the core of the capsule and colloidal silica as protective colloid.

DE-A 19 654 035 describes microcapsules for use as a heat transfer medium, the storage medium being surrounded by a shell of melamine/formaldehyde resin.

Melamine/formaldehyde resin microcapsules are again disclosed, but this time with a specific storage medium as their core, in US-A-5 456 852. The stability of such capsules to hydrolysis in the transport medium, however, which is generally aqueous, is not satisfactory in the longer term.

US-A-4 747 240 teaches the use of macroencapsulated storage substances with a particle size of more than 1000 μm, whose shell is a high-melting resin, in plaster. Capsules of this size, however, require very thick walls in order not to be destroyed when mixed with the building materials.

It is an object of the present invention to use microcapsules of improved stability to hydrolysis as laten:. heat storage media. They should in particular be suitable for use with building materials.

We have found that this object is achieved by the use of the microcapsules I defined at the outset and by novel microcapsules Ia and Ia', and have found processes for their production, shaped articles, and coating compositions.

The lipophilic substances which form what is later the core have their solid/liquid phase transition within the temperature range from −20 to 120° C. Examples of suitable substances are aliphatic hydrocarbon compounds, such as saturated or unsaturated $C_{10}$–$C_{40}$ hydrocarbons, which are branched or preferably linear, such as n-tetradecane, n-pentadecane, n-hexadecane, n-heptadecane, n-octadecane, n-nonadecane, n-eicosane, n-heneicosane, n-docosane, n-tricosane, n-tetracosane, n-pentacosane, n-hexacosane, n-heptacosane, n-octacosane, and also cyclic hydrocarbons, such as cyclohexane, cyclooctane, cyclodecane, for example;

aromatic hydrocarbon compounds, such as benzene, naphthalene, biphenyl, o- or m-terphenyl, $C_1$–$C_{40}$-alkyl-substituted aromatic hydrocarbons, such as dodecylbenzene, tetradecylbenzene, hexadecylbenzene, hexylnaphthalene or decylnaphthalene;

saturated or unsaturated $C_6$–$C_{30}$ fatty acids, such as lauric, stearic, oleic or behenic acid, preferably eutectic mixtures of decanoic acid with, for example, myristic, palmitic or lauric acid;

fatty alcohols, such as lauryl, stearyl, oleyl, myristyl and cetyl alcohol, mixtures such as coconut fatty alcohol, and also the oxo alcohols obtained by hydroformulating (α-olefins and other reactions;

$C_6$–$C_{30}$ fatty amines, such as decylamine, dodecylamine, tetradecylamine or hexadecylamine;

esters, such as $C_1$–$C_{10}$-alkyl esters of fatty acids, examples being propyl palmitate, methyl stearate or methyl palmitate and, preferably, their eutectic mixtures, or methyl cinnamate;

natural and synthetic waxes, such as montanic acid waxes, montan ester waxes, carnauba wax, polyethylene wax, oxidized waxes, polyvinyl ether wax, ethylene-vinyl acetate wax, or hard waxes from the Fischer-Tropsch process;

halogenated hydrocarbons, such as chlorinated paraffin, bromooctadecane, bromopentadecane, bromononadecane, bromoeicosane and bromodocosane.

Mixtures of these substances are also quite suitable provided the melting point is not lowered to a point where it is outside the desired range.

The abovementioned halogenated hydrocarbons, for example, can be admixed as flameproofing agents. It is also possible to add flameproofing agents such as decachlorodiphenyl oxide, octabromodiphenyl oxide, antimony oxide or the flameproofing additives described in US-A 4 797 160.

It is advantageous, furthermore, to add to the capsule core-forming substances compounds that are soluble therein, so as to prevent the reduction in freezing point which occurs in some cases with the non-polar substances. It is advantageous to use, as described in US-A 5 456 852, compounds having a melting point which is higher by from 20 to 120° C. than that of the core substance itself. Suitable compounds are the fatty amides, fatty alcohols and fatty acids mentioned above as lipophilic substances.

The choice of lipophilic substances depends on the temperature range within which the heat storage media are required to operate. For example, substances used for heat storage media in building materials in Europe are preferably lipophilic substances whose solid/liquid phase transition is within the temperature range from 0 to 60° C. Hence the individual substances or mixtures are chosen usually with transition temperatures of 0 to 25° C. for exterior applications and of 15 to 30° C. for interior uses. In the case of solar applications in conjunction with building materials as storage medium, or for preventing the overheating of transparent thermal insulation, as described in EP-A 333 145, transition temperatures of 30 to 60° C. are particularly suitable. It is advantageous, for example, to use alkyl mixtures in the form in which they are obtained as an industrial distillate and in which they are available commercially.

The microcapsules used are composed of from 30 to 100% by ewight, preferably from 30 to 95% by weight, of one or more $C_1$–$C_{24}$-alkyl esters of acrylic and/or methacrylic acid, as monomers I. The microcapsules may also be composed of up to 80% by weight, preferably from 5 to 60% by weight and, In particular, from 10 to 50% by weight, of a bi- or polyfunctional monomer, monomer II, which is insoluble or of sparing solubility in water, and of up to 40% by weight, preferably up to 30% by weight, of other monomers III.

Suitable monomers I are $C_1$–$C_{24}$-alkyl esters of acrylic and/or methacrylic acid. Particularly preferred monomers I are methyl, ethyl, n-propyl and n-butyl acrylate and/or the corresponding methacrylates. Preference is given to isopropyl, isobutyl, sec-butyl and tert-butyl acrylate and the corresponding methacrylates. Methacrylonitrile should also be mentioned. In general, the methacrylates are preferred.

Suitable monomers II are bi- or polyfunctional monomers which are insoluble or of sparing solubility in water but have limited to good solubility in the lipophilic substance. By sparing solubility is meant a solubility of less than 60 g/l at 20° C.

By bi- or polyfunctional monomers are meant compounds having at least 2 nonconjugated ethylenic double bonds.

Those principally coming into consideration are divinyl and polyvinyl monomers, which bring about crosslinking of the capsule wall in the course of the polymerization.

Preferred bifunctional monomers are the diesters of diols of acrylic or methacrylic acid, and the diallyl and divinyl ethers of these diols.

Preferred divinyl monomers are ethanediol diacrylate, divinylbenzene, ethylene glycol dimethacrylate, 1,3-butylene glycol dimethacrylate, methallylmethacrylamide and allyl methacrylate. Particular preference is given to propanediol, butanediol, pentanediol and hexanediol diacrylate, or the corresponding methacrylates.

Preferred polyvinyl monomers are trimethylolpropane triacrylate and trimethacrylate, pentaerythritol triallyl ether and pentaerythritol tetraacrylate.

Suitable monomers III are any other monomers, preferably monomers IIIa such as styrene, α-methylstyrene, β-methylstyrene, butadiene, isoprene, vinyl acetate, vinyl propionate and vinylpyridine.

Particular preference is given to the water-soluble monomers IIIb, examples of which are acrylonitrile, methacrylamide, acrylic, methacrylic, itaconic and maleic acid, maleic anhydride, N-vinylpyrrolidone, 2-hydroxyethyl acrylate and methacrylate, and acrylamido-2-methylpropanesulfonic acid. In addition, particular mention should be made of N-methylolacrylamide, N-methylolmethacrylamide, dimethylaminoethyl methacrylate and diethylaminoethyl methacrylate.

The microcapsules suitable for use in accordance with the invention can be produced by in situ polymerization. The microcapsules are produced by preparing a stable oil-in-water emulsion from the monomers, a free-radical initiator and the lipophilic substance to be encapsulated, which form the disperse phase in said emulsion. The proportion of the oil phase in the oil-in-water emulsion is preferably from 20 to 60% by weight.

The stable emulsion can be prepared by dispersing the lipophilic substance in water and then adding the monomers and the free-radical initiator, or by dispersing the solution of the monomers and of the free-radical initiator, in the lipophilic substance, in water.

The polymerization of the monomers is subsequently triggered by heating, with the polymers produced forming the capsule wall which envelops the lipophilic substance.

As free-radical initiators for the free-radical polymerization reaction it is possible to employ the customary peroxo and azo compounds, judiciously in amounts of from 0.2 to 5% by weight based on the weight of the monomers.

Preferred free-radical initiators are tert-butyl peroxyneodecanoate, tert-amyl peroxypivalate, dilauryl peroxide, tert-amyl peroxy-2-ethylhexanoate, 2,2'-azobis(2,4-dimethyl-valeronitrile), 2,2'-azobis(2-methylbutyronitrile), dibenzoyl peroxide, tert-butyl per-2-ethylhexanoate, di-tert-butyl peroxide, tert-butyl hydroperoxide, 2,5-dimethyl-2,5-di(tert-butylperoxy) hexane and cumene hydroperoxide.

Particularly preferred free-radical initiators are di(3,5,5-trimethylhexanoyl) peroxide, 4,4'-azobisiso-butyronitrile, tert-butyl perpivalate and dimethyl 2,2-azobisisobutyrate. These have a half-life of 10 hours within the temperature range from 30 to 100° C.

The microcapsules of the invention can be produced in a conventional manner; for example, in accordance with the methods described in EP-A 457 154.

The polymerization is generally conducted at from 20 to 100° C., preferably from 40 to 80° C. The temperature of dispersion and polymerization should of course lie above the melting temperature of the lipophilic substances, so that it may be necessary to choose free-radical initiators whose decomposition temperature is above the melting point of the lipophilic substance.

The polymerization is judiciously conducted under atmospheric pressure although it is also possible to operate under subatmospheric or slightly superatmospheric pressure in the case, for example, of a polymerization temperature above 100° C.; in other words, for instance, in the range from 0.5 to 5 bar.

The reaction times for the polymerization are normally from 1 to 10 hours, usually from 2 to 5 hours.

Preferably, microcapsules are formed by stepwise heating of the oil-in-water emulsion. By stepwise here is meant that by raising the temperature the reaction is triggered through the decomposition of the free-radical initiator, and by further heating, which can be carried out continuously or in stages, the polymerization is controlled.

In terms of process engineering the general procedure is to disperse, simultaneously or in succession, a mixture of water, monomers , protective colloids, the lipophilic substances, free-radical initiators and, if used, regulators and to heat this dispersion with thorough stirring to the decomposition temperature of the free-radical initiators.

The rate of polymerization here can be controlled through the choice of temperature and the amount of the free-radical initiator.

The reaction is judiciously started by raising the temperature to an initial level, and the polymerization controlled by further increasing the temperature.

On reaching the final temperature, the polymerization is judiciously continued for a period of up to 2 hours in order to reduce the content of residual monomers.

Following the polymerization proper, at from 90 to 99% by weight conversion, it is generally advantageous substantially to free the aqueous microcapsule dispersions from odoriferous substances, such as residual monomers and other volatile organic constituents. This can be done by conventional means, physically, by distillative removal (especially by steam distillation) or by stripping with an inert gas.

Additionally, the residual monomer content can be lowered chemically by means of free-radical postpolymerization, especially under the action of redox initiator systems, as are set out, for example, in DE-A 44 35 423, DE-A 44 19 518 and DE-A 44 35 422. Particularly suitable oxidizing agents for redox-initiated postpolymerization are hydrogen peroxide, tert-butyl hydroperoxide, cumene hydroperoxide or alkali metal peroxodisulfates. Suitable reducing agents are sodium disulfite, sodium hydrogensulfite, sodium dithionite, sodium hydroxymethanesulfinate, formamidinesulfinic acid, acetone bisulfite (=adduct of sodium hydrogensulfite with acetone), ascorbic acid or reducing sugars, or water-soluble mercaptans such as mercaptoethanol. Postpolymerization with the redox initiator system is conducted at temperatures in the range from 10 to 100° C., preferably from 20 to 90° C. The redox partners can be added to the microcapsule dispersion, independently of one another, in one go, in portions or continuously over a period of from 10 minutes to 4 hours. To improve the postpolymerization effect of the redox initiator system it is also possible to add soluble salts of metals of variable valence, such as salts of iron, of copper or of vanadium, to the microcapsule dispersion.

It is also common to add complexing agents, which hold the metal salts in solution under the reaction conditions.

Preferred protective colloids are water-soluble polymers, since these lower the surface tension of water from a maximum of 73 mN/m to 45 to 70 mN/m and hence ensure the formation of microcapsules with closed walls and particle sizes of from 1 to 30 $\mu$m, preferably from 3 to 12 $\mu$m.

The microcapsules are generally prepared in the presence of at least one organic protective colloid which can be either anionic or neutral. Anionic and nonionic protective colloids can also be employed together. It is preferred to use inorganic protective colloids, alone or in a mixture with organic protective colloids.

Neutral organic protective colloids are cellulose derivatives, such as hydroxyethylcellulose, carboxymethylcellulose and methylcellulose, polyvinylpyrrolidone, vinylpyrrolidone copolymers, gelatin, gum arabic, xanthan, sodium alginate, casein, polyethylene glycols and, preferably, polyvinyl alcohol and partially hydrolyzed polyvinyl acetates.

To enhance the stability of the emulsion it is possible to add anionic protective colloids. The inclusion of anionic protective colloids is particularly important when the microcapsule content of the dispersion is high, since without an additional ionic stabilizer the formation of agglomerated microcapsules may occur. These agglomerates, if from 1 to 3 $\mu$m in diameter, reduce the yield of useful microcapsules and, if larger than about 10 $\mu$m, increase the sensitivity to fracture.

Suitable anionic protective colloids are polymethacrylic acid and the copolymers of sulfoethyl acrylate and methacrylate, of sulfopropyl acrylate and methacrylate, of N-(sulfoethyl)maleimide, of 2-acrylamido-2-alkylsulfonic acids, of styrenesulfonic acids and of vinylsulfonic acid.

Preferred anionic protective colloids are naphthalenesulfonic acid and naphthalenesulfonic acid-formaldehyde condensates, and especially polyacrylic acids and phenolsulfonic acid-formaldehyde condensates.

The anionic protective colloids are generally employed in amounts of from 0.1 to 10% by weight, based on the water phase of the emulsion.

Preference is given to inorganic protective colloids known as

Pickering systems which permit stabilization by very fine solid particles and are insoluble in water but dispersible or insoluble and not dispersible in water but can be wetted by the lipophilic substance.

A Pickering system of this kind can consist of the solid particles alone or, in addition, of auxiliaries which promote the dispersibility of the particles in water or the wettability of the particles by the lipophilic phase. Examples of such auxiliaries are nonionic, anionic, cationic or zwitterionic surfactants or polymeric protective colloids as described above or below. It is also possible to add buffer substances in order to adjust the water phase to a specified advantageous pH. This can reduce the solubility of the fine particles in water and raise the stability of the emulsion. Customary buffer substances are phosphate buffer, acetate buffer and citrate buffer.

The fine solid particles can be metal salts, such as salts, oxides and hydroxides of calcium, magnesium, iron, zinc, nickel, titanium, aluminum, silicon, barium and manganese. Compounds to be mentioned are magnesium hydroxide, magnesium carbonate, magnesium oxide, calcium oxalate, calcium carbonate, barium carbonate, barium sulfate, titanium dioxide, aluminum oxide, aluminum hydroxide and zinc sulfide. Silicates, bentonite, hydroxyapatite and hydroxytalcites may also be mentioned. Particular preference is given to highly disperse silicas, magnesium pyrophosphate and tricalcium phosphate.

The Pickering systems can both be added first to the water phase and added to the stirred oil-in-water emulsion. Many fine solid particles are prepared by precipitation. For instance, magnesium pyrophosphate is prepared by combining the aqueous solutions of sodium pyrophosphate and magnesium sulfate.

In general the pyrophosphate is prepared immediately prior to dispersion by bringing together an aqueous solution of an alkali metal pyrophosphate with at least the stoichiometrically required amount of a magnesium salt, which can be in solid form or in the form of an aqueous solution. In a preferred embodiment the magnesium pyrophosphate is prepared by bringing together aqueous solutions of sodium pyrophosphate ($Na_4P_2O_7$) and magnesium sulfate ($MgSO_4 \cdot 7H_2O$).

The highly disperse silicas can be dispersed as fine, solid particles in water. An alternative option is to use what are known as colloidal dispersions of silica in water. The colloidal dispersions are alkaline, aqueous mixtures of silica. In the alkaline pH range the particles are swollen and are stable in water. For the use of these dispersions as a Pickering system it is advantageous for the oil-in-water emulsion to be adjusted with an acid to a pH of from 2 to 7.

The inorganic protective colloids are generally employed in amounts of from 0.5 to 15% by weight, based on the water phase.

In general, the neutral organic protective colloids are employed in amounts of from 0.1 to 15% by weight, preferably from 0.5 to 10% by weight, based on the water phase.

The dispersing conditions for preparing the stable oil-in-water emulsion are preferably chosen, in a conventional manner, so that the microcapsules have diameters from 1 to 35 $\mu$m, preferably from 3 to 10 $\mu$m.

The microcapsules obtainable in this way are particularly suitable as latent heat storage media in building materials comprising mineral, silicatic or polymeric binders. A distinction is made here between shaped articles and coating compositions. They are notable, for instance, for their hydrolytic stability with respect to the aqueous and often alkaline aqueous materials.

The term shaped mineral article refers to a shaped article formed, after shaping, from a mixture of a mineral binder, water, aggregates and, if desired, auxiliaries by the hardening of the mineral binder/water mixture as a function of time, with or without the action of elevated temperature. Mineral binders are common knowledge. They comprise finely divided inorganic substances, such as lime, gypsum, clay, loam and/or cement, which are converted to their ready-to-use form by pasting with water and in this form, when left to themselves, undergo solidification as a function of time to a stonelike mass in air or else under water, with or without the action of elevated temperature.

The aggregates generally consist of granular or fibrous, natural or synthetic rock (gravel, sand, glass or mineral fibers) or, in special cases, of metals or organic aggregates or of mixtures of said aggregates, with grain sizes or fiber lengths that are adapted in a conventional manner to the intended application. In many cases, for coloring purposes, color pigments are also used as aggregates.

Suitable auxiliaries are, in particular, those substances which accelerate or delay hardening or which influence the elasticity or porosity of the solidified, shaped mineral article. In particular they are polymers, as are known, for example, from US-A 4 340 510, GB-PS 15 05 558, US-A 3 196 122, US-A 3 043 790, US-A 3 239 479, DE-A 43 17 035, DE-A 43 17 036, JP-A 91/131 533 and other documents.

The microcapsules are particularly suitable for modifying bound mineral building materials (mortarlike formulations) comprising a mineral binder which consists of from 70 to 100% by weight cement and from 0 to 30% by weight gypsum. This applies in particular when cement is the sole mineral binder. The effect according to the invention is essentially independent of the type of cement. Depending on the project at hand, therefore, it is possible to use blast furnace slag cement, oil shale cement, Portland cement, hydrophobicized Portland cement, quick-setting cement, high-expansion cement or high-alumina cement, the use of Portland cement having proven particularly favorable. For further details reference may be made to DE-A 19623413.

The dry compositions of binding mineral building materials typically include, based on the amount of mineral binder, from 0.1 to 20% by weight of microcapsules. Relative to conventional building materials, the binding mineral building materials of the invention feature a very good heat storage capacity.

The microcapsules are employed with particular preference in mineral coating compositions such as render. A render of this kind for the interior sector is usually composed of gypsum as binder. The greater the proportion of microcapsules in the coating composition, the greater, of course, is the heat storage and hence also the heat insulation effect. In general, the weight ratio of gypsum to microcapsules is from 95:5 to 70:30. Higher proportions of microcapsules are of course possible.

Coatings for the exterior sector, such as exterior facings, or for moist environments can comprise cement (cementitious renders), lime or waterglass (mineral or silicate renders) or polymer dispersions (synthetic-resin renders) as binders, together with fillers and, if appropriate, pigments for coloration. The proportion of overall solids accounted for by the microcapsules corresponds to the weight ratios for gypsum renders.

Microcapsules prepared in the presence of an inorganic protective colloid are used with particular preference in mineral coating compositions, where they are distinguished by an advantageous viscosity which facilitates processing by making it easier to spread the composition, for example.

For improved heat storage the fully hardened gypsum render also features a reduced tendency to absorb water and a greater elasticity.

The microcapsules are also suitable as an additive to polymeric shaped articles or polymeric coating compositions. By these are meant thermoplastics and thermosets whose processing does not entail destruction of the microcapsules. Examples are epoxy, urea, melamine, polyurethane and silicone resins, and also coating materials—solvent-based, high-solids, powder coatings or waterbornes—and dispersion films. The microcapsules are also suitable for incorporation into polymer foams and fibers. Examples of foams are polyurethane foam, polystyrene foam, latex foam and melamine resin foam.

Advantageous effects can be obtained if the microcapsules are processed in mineral or polymeric shaped articles that are foamed. In addition to the normally desired insulating effect, the storage of heat may bring about a degree of temperature compensation in the case of short-term fluctuations in temperature. This latter property specifically is the reason for the advantageous use of the microcapsules in the abovementioned building materials. A building in which such materials have been used is notable for its reduced energy consumption, since temperature fluctuations between day and night, for example, can be utilized by the heat storage system.

The present invention additionally relates to a process for preparing microcapsules Ia by converting from 30 to 100% by weight, based on the overall weight of the monomers, of one or more $C_1$–$C_{24}$-alkyl esters of acrylic and/or methacrylic acid (monomer I), from 0 to 80% by weight, based on the overall weight of the monomers, of a bi- or polyfunctional monomer (monomers II) which is insoluble or of low solubility in water, and from 0 to 40% by weight, based on the overall weight of the monomers, of other monomers (monomers III), a free-radical initiator and the abovementioned lipophilic substance, together with an inorganic protective colloid, to an oil-in-water emulsion and polymerizing said emulsion by stepwise heating.

The microcapsules of the invention obtained by this process are particularly notable for the fact that on spray drying they give a readily free-flowing capsule powder. The spray drying of the microcapsule dispersion can be carried out in a conventional manner. The operation is generally conducted with an ingoing hot air temperature in the range from 100 to 200° C., preferably from 120 to 160° C., and an outgoing hot air temperature in the range from 30 to 90° C., preferably from 60 to 80° C. The aqueous polymer dispersion can be sprayed in the stream of hot air by means, for example, of single- or multi-substance nozzles or by way of a rotating disk. Separation of the polymer powders is usually carried out using cyclones or filter separators. The sprayed aqueous polymer dispersion and the stream of hot air are preferably guided in parallel.

The capsule powder of the invention offers the user not only transportation and packaging advantages but also a much wider scope for formulation and use. This is particularly advantageous for building materials, since the powder can be mixed beforehand with other solids, such as gypsum, and the user can establish the appropriate processing properties, using water, in the manner with which he or she is familiar.

The examples which follow are intended to elucidate the invention further. In these examples the percentages are by weight.

Example 1

Water phase:

| | |
|---|---|
| 930 g | of water |
| 263 g | of a 30% colloidal dispersion of $SiO_2$ in water at pH 9.8 (12 nm, 240 $m^2/g$) |
| 18.2 g | of a 20% strength aqueous solution of a polymer formed from 59% 2-acrylamido-2-methylpropanesulfonic acid Na salt, 20% acrylic acid, 20% methyl acrylate and 1% styrene, K value: 69 |
| 10.5 g | of a 2.5% aqueous solution of potassium dichromate |

Oil phase:

| | |
|---|---|
| 1100 g | of $C_{18}$–$C_{20}$-alkane (industrial distillate) |
| 129.5 g | of methyl methacrylate |
| 57.4 g | of butanediol diacrylate |
| 1.9 g | of ethylhexyl thioglycolate |
| 2.3 g | of t-butyl perpivalate |

Feedstream 1: 2.73 g of t-butyl hydroperoxide, 70% strength in water
Feedstream 2: 0.84 g of ascorbic acid, 0.061 g of NaOH, 146 g of $H_2O$ The above water phase was initially introduced at room temperature and was adjusted to a pH of 7 with 14 g of 10% strength hydrochloric acid. Following the addition of the oil phase, the two phases were dispersed using a high-speed dissolver stirrer at 4200 rpm and the pH was adjusted to 4 using 15 g of 10% strength hydrochloric acid. After 40 minutes of dispersing a stable emulsion with a particle size of from 2 to 8 μm (diameter) was obtained. The emulsion was heated in 4 minutes to 56° C., while stirring with an anchor stirrer, then heated to 58° C. over the course of a further 20 minutes, to 71° C. over the course of a further 60 minutes and to 85° C. over the course of a further 60 minutes. The resulting microcapsule dispersion was cooled with stirring to 70° C., and feedstream 1 was added. Feedstream 2 was metered in with stirring over 80 minutes at 70° C. The composition was then cooled, and the resulting microcapsule dispersion had a solids content of 45.7% and an average particle size D (4.3)=4.22 μm.

The dispersion was dried without problems in a laboratory spray dryer with a dual-substance nozzle and cyclone separation, at a heating gas entry temperature of 130° C. and a powder exit temperature from the spraying tower of 70° C. In differential calorimetry, when heated at a heating rate of 1 K/minute, microcapsule dispersion and powder showed a melting point between 26.5 and 29.5° C. with a conversion enthalpy of 130 J/g of alkane mixture.

The microcapsule dispersion was mixed in various proportions with a customary commercial ready-mixed anhydrous gypsum plaster powder (Knauf: "Goldband Fertigmörtel [mortar premix], Fertigputzgips nach DIN 1168"). Samples of 10, 20, 30, 40% by weight of alkane as latent heat storage medium were weighed out onto the solid plaster powder, and water as well was added for adjustment to the customary processing consistency. The plaster samples hardened in a crack-free layer thickness of 5 mm and exhibited a markedly reduced tendency to absorb water, and a relatively high elasticity. The microcapsules within the fully cured plaster panels were not damaged, and the samples showed the same enthalpy of fusion as the microcapsules alone in accordance with their content in the plaster panel.

Example 2

Water phase:

| | |
|---|---|
| 300 g | of water |
| 113 g | of a solution of 2.15 g of $Na_4P_2O_7$ and 110.8 g of water |
| 8 g | of a 20% strength aqueous solution of a polymer formed from 59% 2-acrylamido-2-methylpropanesulfonic acid Na salt, 20% acrylic acid, 20% methyl acrylate and 1% styrene, K value: 69 |
| 8 g | of a 10% strength aqueous solution of polyvinyl alcohol (88% hydrolyzed, average molecular weight 128.000) |
| 4 g | of a 2.5% strength aqueous solution of potassium dichromate |

Oil phase:

| | |
|---|---|
| 440 g | of an industrial distillate of $C_{14}$–$C_{17}$-alkanes |
| 39 g | of methyl methacrylate |
| 17 g | of butanediol diacrylate |
| 1 g | of t-butyl perpivalate |

Feedstream: 41 g of a solution of 4.0 g of $MgSO_4*7H_2O$ and 37 g of water

The above water phase was initially introduced at room temperature and the oil phase was added and dispersed in a high-speed dissolver stirrer at 3500 rpm. Then the magnesium sulfate solution was added and dispersal was continued at 4500 rpm for 50 minutes. This gave a stable emulsion with a particle size of 2 to 18 μm (diameter). The emulsion was heated to 61° C. in 20 minutes, while stirring with an anchor stirrer, and was heated to 63° C. over the course of a further 20 minutes, to 71° C. over the course of a further 60 minutes and to 85° C. over the course of a further 60 minutes. It was then cooled. The resulting microcapsule dispersion had a solids content of 42.3%. In differential calorimetry, when heated at a heating rate of 5 K/minute, the microcapsule dispersion showed a melting point between 2 and 12° C. with a conversion enthalpy of 140 J/g of alkane mixture.

Example 3

Water phase:

| | |
|---|---|
| 220 g | of water |
| 170 g | of a solution of 3.24 g of $Na_4P_2O_7$ and 166.8 g of water |
| 16 g | of a 10% strength aqueous solution of polyvinyl alcohol (88% hydrolyzed, average molecular weight 128.000) |
| 4 g | of a 2.5% strength aqueous solution of potassium dichromate |

Oil Phase:

| | |
|---|---|
| 440 g | of an industrial distillate of $C_{14}$–$C_{17}$-alkanes |
| 39 g | of methyl methacrylate |
| 17 g | of butanediol diacrylate |
| 1 g | of t-butyl perpivalate |

Feedstream: 62 g of a solution of 6.0 g of $MgSO_4*7H_2O$ and 56 g of water

The above water phase was initially introduced at room temperature and the oil phase was added and dispersed in a high-speed dissolver stirrer at 5500 rpm. Then the magnesium sulfate solution was added and dispersal was continued at 5500 rpm for 30 minutes. This gave a stable emulsion with a particle size of 2 to 20 μm (diameter). The emulsion was heated to 61° C. in 20 minutes, while stirring with an anchor stirrer, and was heated to 63° C. over the course of a further 20 minutes, to 71° C. over the course of a further 60 minutes and to 85° C. over the course of a further 60 minutes. It was then cooled. The resulting microcapsule dispersion had a solids content of 43.5%.

Example 4

Water phase:

| | |
|---|---|
| 140 g | of water |
| 40 g | of a 10% strength aqueous solution of polyvinylpyrrolidone, K value: 90 |
| 10 g | of a 20% strength aqueous solution of a polymer formed from 59% 2-acrylamido-2-methylpropanesulfonic acid Na salt, 20% acrylic acid, 20% methyl acrylate and 1% styrene, K value: 69 |

Oil phase:

| | |
|---|---|
| 157 g | of an industrial distillate of $C_{14}$–$C_{17}$-alkanes |
| 18.5 g | of methyl methacrylate |
| 8.2 g | of butanediol diacrylate |
| 0.27 g | of ethylhexyl thioglycolate |
| 0.33 g | of t-butyl perpivalate |

The above water phase was initially introduced at room temperature and the oil phase was added and dispersed for 30 minutes in a high-speed dissolver stirrer at 4500 rpm. This gave a stable emulsion with a particle size of 2 to 25 µm (diameter). The emulsion was heated to 80° C., while stirring with an anchor stirrer, and was held at that temperature for 5 hours. It was then cooled. The resulting microcapsule dispersion had a solids content of 36.1%.

Example 5

Water phase:

| | |
|---|---|
| 914 g | of water |
| 536 g | of a 10% strength aqueous solution of polyvinyl alcohol (88% hydrolyzed, average molecular weight 128.000) |

Oil phase:

| | |
|---|---|
| 1256 g | of octadecane |
| 148 g | of methyl methacrylate |
| 65.6 g | of butanediol diacrylate |
| 1.9 g | of ethylhexyl thioglycolate |
| 2.64 g | of t-butyl perpivalate |

Feedstream 1: 3.12 g of t-butyl hydroperoxide, 70% strength in water
Feedstream 2: 0.96 g of ascorbic acid, 0.07 g of NaOH, 160 g of $H_2O$ The above water phase was initially introduced at 30° C. and the oil phase was added and dispersed for 20 minutes in a high-speed dissolver stirrer at 3500 rpm. This gave a stable emulsion with a particle size of 3 to 8 µm (diameter). The emulsion was heated to 61° C. in 20 minutes, while stirring with an anchor stirrer, and was heated to 63° C. over the course of a further 20 minutes, to 71° C. over the course of a further 60 minutes and to 85° C. over the course of a further 60 minutes. The resulting microcapsule dispersion was cooled to 70° C. with stirring, and feedstream 1 was added. Feedstream 2 was metered in with stirring at 70° C. over the course of 80 minutes. The composition was then cooled. The resulting microcapsule dispersion had a solids content of 49.2%.

The microcapsule dispersion was mixed in various proportions with a customary commercial ready-mixed anhydrous gypsum plaster powder (Knauf: "Goldband Fertigmörtel [mortar premix], Fertigputzgips nach DIN 1168"). Samples of 10, 20, 30, 40% by weight of alkane as latent heat storage medium were weighed out onto the solid plaster powder, and water as well was added for adjustment to the customary processing consistency. The plaster samples thus produced hardened in a crack-free layer thickness of 5 mm and exhibited a markedly reduced tendency to absorb water, and a relatively high elasticity. The microcapsules within the fully cured plaster panels were not damaged, and the samples showed the same enthalpy of fusion as the microcapsules alone in accordance with their content in the plaster panel.

Example 6

Example 4 was repeated but using 10 g of a 30% strength aqueous solution of a phenolsulfonic acid-formaldehyde condensate instead of the 2-acrylamido-2-methylpropanesulfonic acid polymer. Instead of 18.5 g of methyl methacrylate, 16.5 g of methyl methacrylate and 2 g of styrene were used. The resulting microcapsule dispersion has a solids content of 39.4%.

Example 7

Water phase:

| | |
|---|---|
| 114.2 g | of water |
| 67 g | of a 10% strength aqueous solution of polyvinyl alcohol (88% hydrolyzed, average molecular weight 128.000) |

Oil phase:

| | |
|---|---|
| 155.4 g | of octadecane |
| 18.5 g | of methyl methacrylate |
| 8.2 g | of butanediol diacrylate |
| 1.6 g | of stearic acid |
| 0.33 g | of t-butyl perpivalate |

The above water phase was initially introduced at 30° C. and the oil phase was added and dispersed for 20 minutes in a high-speed dissolver stirrer at 3500 rpm. This gave a stable emulsion with a particle size of 2 to 10 µm (diameter). The emulsion was heated to 61° C. in 20 minutes, while stirring with an anchor stirrer, and was heated to 63° C. over the course of a further 20 minutes, to 71° C. over the course of a further 60 minutes and to 85° C. over the course of a further 60 minutes. It was then cooled. The resulting microcapsule dispersion had a solids content of 51.7%.

The microcapsule dispersion was dried in air and measured in a Mettler Toledo DSC 820 at heating and cooling rates of 10 K/min. In the course of the 2nd heating procedure, an enthalpy of fusion of 222 J/g was found at a melting point of 26.3° C. In the course of the 2nd cooling procedure, an enthalpy of crystallization of 220 J/g was found at a crystallization point of 23° C.

We claim:
1. A method of using, as latent heat storage media, microcapsules I comprising as core materials one or more lipophilic substances whose solid/liquid phase transition is within the range from −20 to 120° C. and as shell a polymer obtainable by free-radical polymerization of a monomer mixture comprising from 30 to 100% by weight, based on the overall weight of the monomers, of one or more $C_1$–$C_{24}$-alkyl esters of acrylic and/or methacrylic acid (monomer I), from 0 to 80% by weight, based on the overall weight of the monomers, of a bi- or polyfunctional monomer (monomer II) which is insoluble or of low solubility in water, and from 0 to 40% by weight, based on the overall weight of the monomers, of other monomers (monomers III).

2. The method as claimed in claim 1 of using microcapsules I obtainable by heating an oil-in-water emulsion in which the monomers, a free-radical initiator and the lipophilic substance are present as disperse phase.

3. The method as claimed in claim 1 of using microcapsules I obtainable by continuous or stepwise heating.

4. The method as claimed in claim 1 of using microcapsules I obtainable by polymerizing the monomers, which together with the free-radical initiator, the lipophilic substance and an inorganic protective colloid are present as disperse phase of an oil-in-water emulsion.

5. The method as claimed in claim 1 of using microcapsules I as latent heat storage media in shaped mineral articles or coating compositions.

6. The method as claimed in claim 1 of using microcapsules I as latent heat storage media in polymeric shaped articles or coating compositions.

7. A shaped mineral article comprising microcapsules as set forth in claim 1 along with other customary additives to shaped mineral articles.

8. A mineral coating composition comprising microcapsules as set forth in claim 1 along with other customary additives to mineral coating compositions.

9. A polymeric shaded article comprising microcapsules as set forth in claim 1 along with other customary additives to polymeric shaped articles.

10. A polymeric coating composition comprising microcapsules as set forth in claim 1 along with other customary additives to polymeric coating compositions.

11. A process for preparing microcapsules Ia as set forth in claim 1 by converting from 30 to 100% by weight, based on the overall weight of the monomers, of one or more $C_2$–$C_{24}$-alkyl esters of acrylic and/or methacrylic acid (monomer I), from 0 to 80% by weight, based on the overall weight of the monomers, of a bi- or polyfunctional monomer (monomer II) which is insoluble or of low solubility in water, and from 0 to 40% by weight, based on the overall weight of the monomers, of other monomers (monomers III), a free-radical initiator and the lipophilic substance, together with an inorganic protective colloid, to an oil-in-water emulsion and polymerizing said emulsion by stepwise heating.

12. A process as claimed in claim 1, wherein the microcapsule dispersion is subsequently spray-dried.

13. A microcapsule Ia obtainable by a process as claimed in claim 11.

* * * * *